United States Patent
Tremlet

(10) Patent No.: US 11,700,246 B2
(45) Date of Patent: Jul. 11, 2023

(54) SECURE AUTHENTICATION BASED ON PHYSICALLY UNCLONABLE FUNCTIONS

(71) Applicant: Maxim Integrated Products, Inc., San Jose, CA (US)

(72) Inventor: Christophe Tremlet, Aubagne (FR)

(73) Assignee: Maxim Integrated Products, Inc., San Jose, CA (US)

( * ) Notice: Subject to any disclaimer, the term of this patent is extended or adjusted under 35 U.S.C. 154(b) by 1277 days.

(21) Appl. No.: 14/202,239

(22) Filed: Mar. 10, 2014

(65) Prior Publication Data
US 2014/0279532 A1   Sep. 18, 2014

(30) Foreign Application Priority Data

Mar. 15, 2013   (EP) ..................................... 13305296

(51) Int. Cl.
*G06Q 20/00* (2012.01)
*H04L 9/40* (2022.01)
(Continued)

(52) U.S. Cl.
CPC .............. *H04L 63/08* (2013.01); *G06F 21/73* (2013.01); *G06Q 20/02* (2013.01);
(Continued)

(58) Field of Classification Search
CPC ........... G06Q 2220/00; G06Q 2220/10; G06Q 2220/16
(Continued)

(56) References Cited

U.S. PATENT DOCUMENTS

| | | | | |
|---|---|---|---|---|
| 5,565,316 A | * | 10/1996 | Kershaw | .................. G09B 7/02 434/118 |
| 2003/0204743 A1 | * | 10/2003 | Devadas | ................. G06F 21/31 726/9 |

(Continued)

FOREIGN PATENT DOCUMENTS

| | | |
|---|---|---|
| EP | 2456121 | 5/2012 |
| EP | 2456121 A2 | 5/2012 |

OTHER PUBLICATIONS

See Dialog Search History.*
(Continued)

*Primary Examiner* — Dante Ravetti
(74) *Attorney, Agent, or Firm* — North Weber & Baugh LLP; Michael North

(57) ABSTRACT

The invention relates to an electronic device, and more particularly, to systems, devices and methods of authenticating the electronic device using a challenge-response process that is based on a physically unclonable function (PUF). The electronic device comprises a PUF element, a processor and a communication interface. The PUF element generates an input signal based on at least one PUF that has unique physical features affected by manufacturing variability. A challenge-response database, comprising a plurality of challenges and a plurality of corresponding responses, is set forth by the processor based on the PUF-based input and further provided to a trusted entity. During the trusted transaction, the processor generates a response in response to a challenge sent by the trusted entity based on the PUF-based input, and thereby, the trusted entity authenticates the electronic device by comparing the response with the challenge-response database.

4 Claims, 6 Drawing Sheets

(51) Int. Cl.
*G06Q 20/32* (2012.01)
*G06Q 20/02* (2012.01)
*G06Q 20/38* (2012.01)
*G06Q 20/40* (2012.01)
*G09C 1/00* (2006.01)
*G06F 21/73* (2013.01)
*H04L 9/32* (2006.01)
*G07C 9/27* (2020.01)
*G06Q 50/26* (2012.01)
*G07C 9/00* (2020.01)

(52) U.S. Cl.
CPC ....... *G06Q 20/3227* (2013.01); *G06Q 20/388* (2013.01); *G06Q 20/40* (2013.01); *G06Q 20/401* (2013.01); *G06Q 50/265* (2013.01); *G07C 9/27* (2020.01); *G09C 1/00* (2013.01); *H04L 9/3278* (2013.01); *G07C 2009/00388* (2013.01); *H04L 2209/56* (2013.01)

(58) Field of Classification Search
USPC .......................................... 705/59; 380/262
See application file for complete search history.

(56) References Cited

U.S. PATENT DOCUMENTS

| | | | |
|---|---|---|---|
| 2006/0209584 A1* | 9/2006 | Devadas | G06F 21/31 365/52 |
| 2009/0083833 A1 | 3/2009 | Ziola | |
| 2010/0146261 A1* | 6/2010 | Talstra | G06F 21/10 713/176 |
| 2010/0250936 A1* | 9/2010 | Kusakawa | H04L 9/3278 713/169 |
| 2012/0066515 A1* | 3/2012 | Kasuya | H04L 9/3242 713/189 |
| 2012/0131340 A1* | 5/2012 | Teuwen | H04L 9/3278 713/168 |
| 2013/0047209 A1* | 2/2013 | Satoh | H04L 9/3278 726/2 |
| 2013/0156183 A1* | 6/2013 | Komano | H04L 9/0861 380/44 |
| 2013/0276151 A1* | 10/2013 | Lewis | G06F 21/70 726/34 |
| 2013/0311768 A1* | 11/2013 | Fosmark | G06Q 20/3223 713/155 |
| 2014/0111234 A1* | 4/2014 | Laackmann | G01R 31/31719 324/750.3 |

OTHER PUBLICATIONS

Response filed Jun. 2, 2016, and marked-up and clean versions of the claims, in European Patent Application No. 13305296.9, filed Mar. 15, 2013 (11pgs).

Office Action dated Jan. 27, 2016, in European Application No. 13305296.9-1995 (6pgs).

Gassend, Blaise L. P., "Physical Random Functions," XP-02316843 (89pgs).

Massachusettes Institute of Technology, "CSAIL Computer Science and Artificial Intelligence Laboratory, Identification and Authentication of Integrated Circuits," to appear in Concurrency and Computations: Practice and Experience, Wiley, Jun. 2003, Computation Structures Group Memo 466 (26pgs).

Extended European Search Report dated Aug. 30, 2013, in parent Euorpean Patent Application No. 13305296.9 (7pgs).

Gassend, B. et al., "Identification and authentication of integrated circuits," Concurrency and computational practice and experience, Wiley, London, GB, vol. 3, Jun. 1, 2003, pp. 1-26, XP007908366, ISSN: 1532-0626 (27pgs).

Gassend, B.L.P., "Physical random functions; Thesis," Thesis at the Massachusetts Institute of Technology, Feb. 1, 2003, pp. 1-89, XP002316843 (90pgs).

* cited by examiner

SECURE AUTHENTICATION BASED ON PHYSICALLY UNCLONABLE FUNCTIONS

CROSS REFERENCE TO RELATED APPLICATIONS

This application claims foreign priority to European Patent Application No. 13305296.9, filed Mar. 15, 2013, which application is hereby incorporated herein by reference in its entirety.

BACKGROUND

1. Technical Field

The present invention relates to an electronic device, and more particularly, to systems, devices and methods of using a challenge-response process to authenticate the electronic device during a trusted transaction.

2. Background of the Invention

Financial transactions are normally implemented on financial terminals, such as automatic teller machines (ATM) and specialized credit card readers. Secure processing units have been integrated in these financial terminals to provide an enhanced security level to the financial transactions. Many secure measures are particularly adopted within the secure processing units to reliably authenticate card holder information and merchant information. Based on such authentication, a trusted entity that manages the financial account of the card holders may therefore interact with the financial terminals to complete the financial transactions.

Although the ATMs and the credit card readers have a long history, the progress of the internet has reshaped the financial transactions, and the emerging wireless technologies will continue to revolutionize the entire financial industry. The internet and wireless technologies allow a generic computer or mobile device owned by an individual customer to be conveniently configured to a financial terminal or a point-of-sale (POS) terminal. A software program is applied on the device to provide an interface, such that the user may conveniently access the account managed by the trusted entity and make a transaction request. In particular, the individual customer may use the computer or mobile device to check balances on a bank or credit card account, transfer moneys between different accounts or make a payment for an order. The individual customer does not need to physically access a financial terminal owned by the bank or the store any more. Therefore, the financial transactions are made much easier and more convenient for the individual customer.

In addition to financial transactions, the generic computer or mobile device may also be broadly used for other trusted transactions. For instance, identity information may be securely stored on the device, such that the device may be used as an electronic passport or an electronic driver's license. The government may also allow the user to manage some high security account using the generic computer or mobile device.

However, the computer or mobile device only offers a limited level of security for party authentication. The computer or mobile device is originally manufactured for general computation or communication purposes, and normally does not incorporate any secure processing unit that is integrated in an ATM or a credit card reader. Even though some computers or mobile devices implement secure integrated circuits (ICs) to enhance the level of security by securely storing credentials, said credentials may still be retrieved through reverse engineering techniques by a sophisticated attacker who has time, equipment and expertise. The incentive might still be high enough for such an attacker to conduct the attack and extract the credentials. Not to mention, such secure ICs may increase the price of the computer or mobile device, while the generic computer or mobile device is particularly sensitive to any price increase.

Most state-of-the-art computers or mobile devices have to rely on software techniques to provide a certain level of security required by the financial transactions. Sensitive data, such as a personal identification number (PIN) or an encryption key, are involved to authenticate the related parties and encrypt data for data communication. However, such sensitive data may only be stored in the same insecure manner as other computational data in the computer or mobile device. As a serious security threat, a hacker may recover the sensitive data from the memory, and use the sensitive data to tamper the corresponding financial account. Even when stored in a secure Integrated Circuit, the sensitive data might be vulnerable to attacks by those sophisticated attackers. An attacker may also access the credentials when they are programmed during device manufacturing.

Therefore, a need exists to provide secure data in an electronic device like a generic computer or a mobile device, when the electronic device is involved in a trusted transaction. Additional methods may be adopted to further process the secure data and improve party authentication or data communication in such an electronic device.

SUMMARY OF THE INVENTION

Various embodiments of the present invention relate to an electronic device owned by a user who requested a trusted transaction, and more particularly, to systems, devices and methods of authenticating the electronic device using a challenge-response process that is based on physically unclonable functions (PUFs) integrated within the electronic device. The PUFs have operational characteristics that are associated with physical features affected by manufacturing variability.

In accordance with the invention, an electronic device that comprises a PUF element, a processor and a communication interface. The processor sets forth a challenge-response database based on an input signal from the PUF during a course of manufacturing and testing the processor. The challenge-response database comprises a plurality of challenges and a plurality of responses, and each challenge is associated with at least one response in the plurality of responses. The communication interface communicates the plurality of challenges into and the plurality of response out of the processor.

During a trusted transaction, the processor generates a response in response to a challenge based on an input signal based on the PUF. The challenge is sent by a trusted entity, and received by the electronic device at the communication interface. The communication interface returns the response to the trusted entity, such that the trusted entity authenticates the electronic device by comparing the response to a challenge-response database that was set forth and provided by the processor based on the PUF-based input signal during a course of manufacturing and testing the processor.

In accordance with the invention, a method of device authentication is enabled by a PUF-based challenge-response database that was set forth during a course of manufacturing and testing the processor. A challenge is first received from a trusted entity during a trusted transaction, and a response is accordingly generated in response to the challenge based on an input signal based on the PUF. The response is communicated to the trusted entity. The trusted entity authenticates the device by comparing the response with a challenge-response database that was set forth based on the PUF. A confirmation signal is issued to the electronic device upon authentication of this response. Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
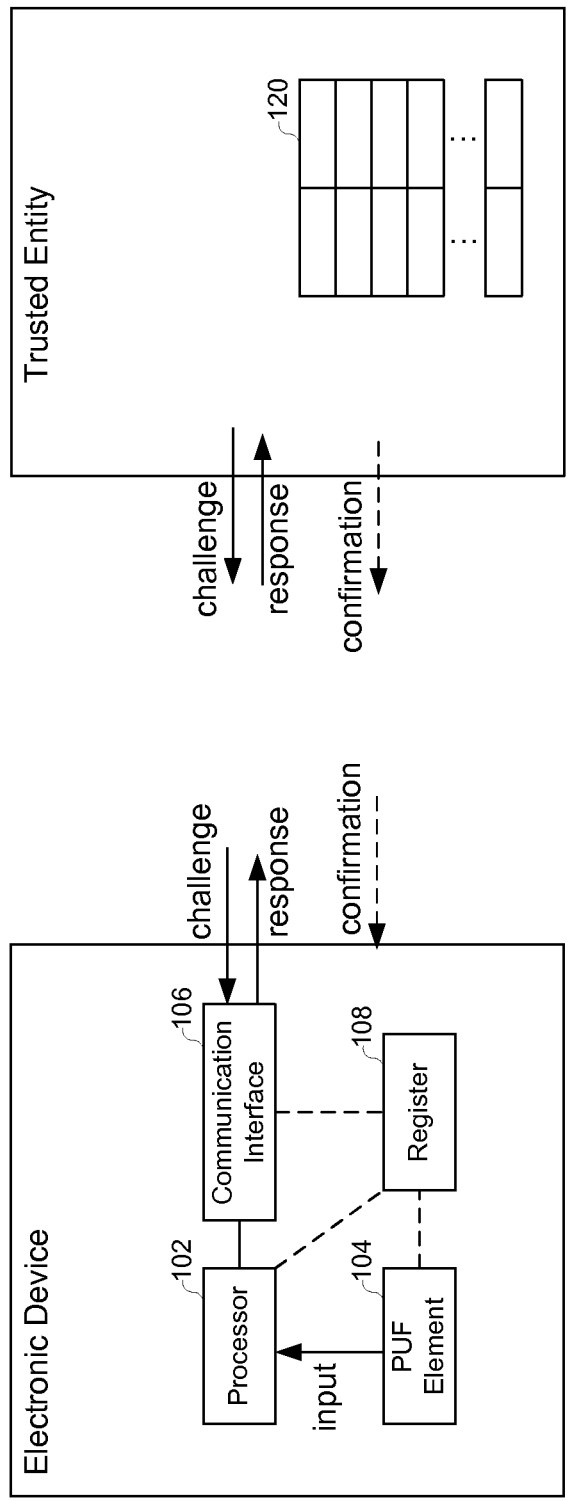
FIG. 1A illustrates an exemplary block diagram of an electronic device that integrates PUFs according to various embodiments of the invention.
FIG. 1B illustrates an exemplary block diagram of a trusted entity that authenticates the electronic device according to various embodiments of the invention.

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the present invention relate to an electronic device owned by a user who requested a trusted transaction, and more particularly, to systems, devices and methods of authenticating the electronic device using a challenge-response process that is based on physically unclonable functions (PUFs) integrated within the electronic device. The PUFs have operational characteristics that are associated with physical features affected by manufacturing variability. Such operational characteristics are not only unique to each PUF, but also substantially difficult to be duplicated or cloned; therefore, the PUFs are utilized to provide an input that is uniquely associated with the electronic device that integrates the PUFs. The electronic devices may be uniquely identified based on the input provided by the PUFs. More importantly, use of the PUFs might spare a need for storing sensitive data, such as cryptographic keys, within a memory that can be easily tampered by an intruder endeavoring to bypass or fool an authentication process. In some other embodiments, cryptographic keys might still be used in association with the PUFs. Since the PUFs are not susceptible to physical attacks or reverse engineering, the combination of the PUFs and the cryptographic keys would efficiently frustrate attempts of a sophisticated attack to hacker the key, enabling a higher level of security.

In accordance with the present invention, the input provided by the PUFs is used to generate a plurality of responses each of which is associated with one of a plurality of challenges. A challenge-response database based on the plurality of challenges and responses is established and provided to a trusted entity. During authentication, the trusted entity issues a challenge selected form the plurality of challenges, and verify the electronic device according to a response that is returned in response to the challenge. As a result, the level of security is enhanced for authentication not only by the integration of the PUFs within the electronic device, but also by the random selection of the challenge that is enabled by the challenge-response database. The trusted entity may repeat the sequence of challenge-response authentication multiple times in order increase the level of security.

FIG. 1A illustrates an exemplary block diagram 100 of an electronic device that integrates PUFs according to various embodiments of the invention, and FIG. 1B illustrates an exemplary block diagram 110 of a trusted entity that authenticates the electronic device 100 according to various embodiments of the invention. The electronic device 100 comprises a processor 102, a PUF element 104, a communication interface 106 and a register 108. The PUF element 104 provides a unique input to the processor 102 based on its unique operational characteristics. When a challenge is received via the communication interface 106, the processor 102 processes the challenge based on the unique input using a particular response method, and generates a response associated with the challenge. This response is transferred out by the communication interface 106. The register 108 is coupled to the processor 102, the PUF element 104 and the communication interface 106, and used to temporarily store the unique input, the challenge and the response as needed.

The trusted entity 110 issues the challenge to and receives the response from the electronic device 100. The response is verified according to a challenge-response database 120 in the trusted entity 110, and once verified, the trusted entity 110 sends another confirmation signal to the electronic device 100 to acknowledge the success of device authentication.

The PUF element 104 comprises at least one PUF and a PUF circuit. The at least one PUF in different electronic devices 100 adopts slight different physical features. These difference physical features are fundamentally related with variations in geometrical width, length, thickness and variations of material properties, such as dielectric constant and resistivity. The PUF circuit, coupled to the at least one PUF, converts such differences in physical features to the unique input. In certain embodiments, the PUF element 104 is not an independent component coupled to the processor 102; rather, the PUF element 104 is integrated within the processor 102.

Due to manufacturing variability, the differences in the physical features are unavoidable for the PUFs in different electronic devices. Regardless of how well semiconductor processes are managed, subtle physical differences are inevitable among semiconductor devices located on different wafers or at different locations across a single wafer. These differences originate from non-uniformity and small imprecisions in various aspects of a semiconductor manufacturing process at the particular location. In particular, differences may be introduced by non-uniform dopant distribution, mask misalignment in lithography, condition variations in chemical or physical vapor deposition and mechanical polishing. Therefore, even though the semiconductor devices are intended to be identical, their local semiconductor manufacturing processes are not entirely consistent, and the resulting PUFs in distinct semiconductor devices demonstrate their specificity for physical, electrical, mechanical, magnetic, chemical features.

The differences are statistically random and very small among the PUFs included in various devices. There may be small measurable gradients across the wafer in more than one direction, and very small differences exist in capacitance, speed, or temperature sensitivity from one transistor to the next. For instance, two otherwise identical capacitors might differ by 0.1% in capacitance due to difference in dielectric thickness and plate area. The former may be caused by variation in a dielectric formation step, while the latter results from variations in lithography or etching. Semiconductor design normally strives to minimize these differences and guarantee that performance of the end product is controlled within a certain tolerance. However, the differences are utilized here to generate statistically random inputs that are unique, non-duplicable and repeatable.

The at least one PUF may be implemented with regular circuit, and does not need any change to existing complimentary metal-oxide semiconductor (CMOS) technologies. Examples of the at least one PUF include, but are not limited to, a capacitor array, a resistor array, a delay loop and a memory. In one embodiment based on the delay loop, a slight variation in the delay time through a large number of logic gates are converted to a multiple bit digital signal. In another embodiment, a static random access memory (SRAM) has a random pattern of on-bit and off-bit associated with each electronic device. In certain embodiments, a plurality of capacitor pairs are sequentially selected from an array of identical capacitors. Each capacitor pair is related to a random difference in capacitance based on their physical features, and the PUF circuit may generate a multiple bit digital signal from comparison results of the plurality of capacitor pairs. As a result, the unique input is conveniently provided based on the at least one PUF included in the PUF element.

In some embodiments, the particular response method adopted by the processor 102 in the electronic device 100 is one of a plurality of response methods, and each challenge is associated with a plurality of responses each of which is generated according to one of the plurality of response methods. In one embodiment, the trusted entity 110 actively determines the particular response method by including a selection signal in the challenge. The processor 102 generates the response in response to the challenge according to the particular response method as selected by the trusted entity 110. In another embodiment, the processor 102 selects the particular response method, and communicates a selection signal in the response. The trusted entity 110 receives the selection signal, and determines the response is properly associated with one of the plurality of responses as suggested by the selection signal.

The trusted entity 110 is an authority that manages an account associated with the electronic device 100, and this account is normally sensitive to security. In various embodiments of the invention, the trusted entity 110 may a bank, a credit card company, a government agency or any other entities that requires trusted transactions with a user in possession of the electronic device 100. The trusted entity 110 may verify the identity of the user based on PUF-based device authentication during financial transactions, such as balance checking, bank transfer and credit card payments. Moreover, when the trusted entity 110 is the government agency, the electronic device 100 may be securely applied as an electronic passport or driver's license, and such an application sometimes imposes a higher level of security.

One of those skilled in the art knows that the electronic device 100 may be a desktop computer, a laptop computer, a tablet, a cellular phone and many other devices that may be used for trusted transactions. In particular, as mobile devices are widely applied in our daily life, they may be conveniently converted to process trusted transactions. The PUFs integrated in the mobile devices provides the level of security required by such transactions, while only introducing a limited, if not negligible, cost increase.

Figure 2:
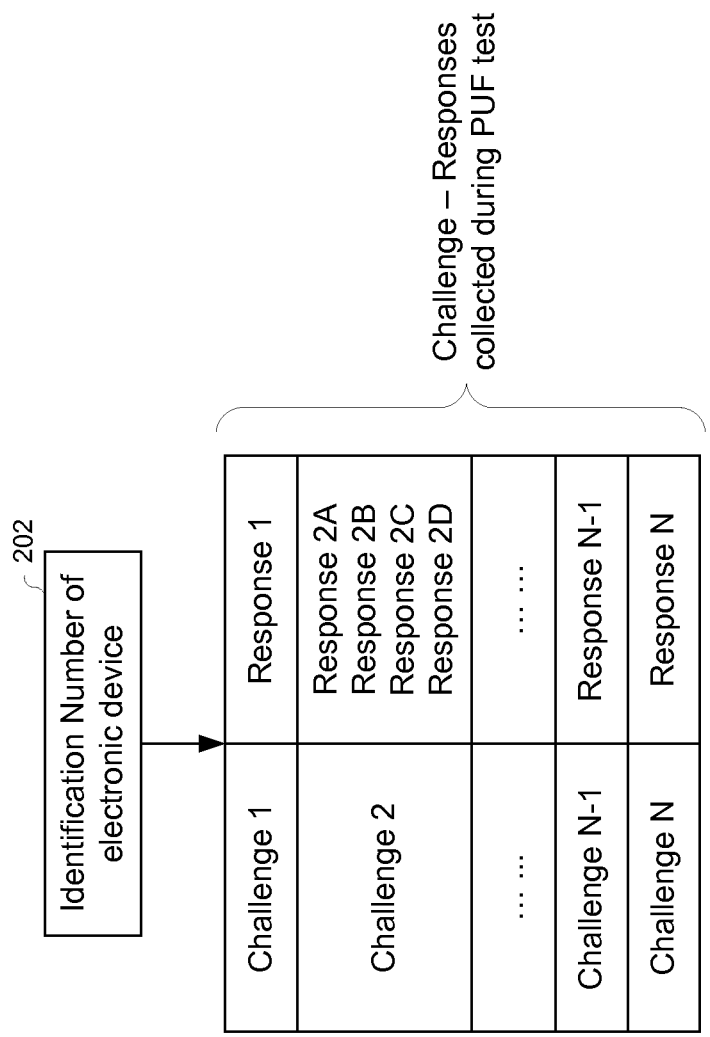
FIG. 2 illustrates an exemplary diagram of a challenge-response database according to various embodiments of the invention.

FIG. 2 illustrates an exemplary diagram 120 of a challenge-response database according to various embodiments of the invention. The challenge-response database 120 is one of a plurality of databases stored in the trusted entity 110. Since each electronic device is associated with a unique input from a corresponding PUF element 104, this challenge-response database is uniquely associated with the electronic device, and therefore, may be identified with an identification number 202 for the corresponding electronic device. During device authentication, the identification number 202 is communicated between the trusted entity and the electronic device to associate the challenge and the response with the proper database.

The challenge-response database 120 comprises a plurality of challenges. Each challenge is associated with at least one response. In some embodiments, a challenge may be associated with a plurality of responses, and for instance, challenge 2 is associated with responses 2A, 2B, 2C and 2D. As disclosed above, a selection signal has to be involved to indicate which response is generated in response to the challenge.

Figure 3:
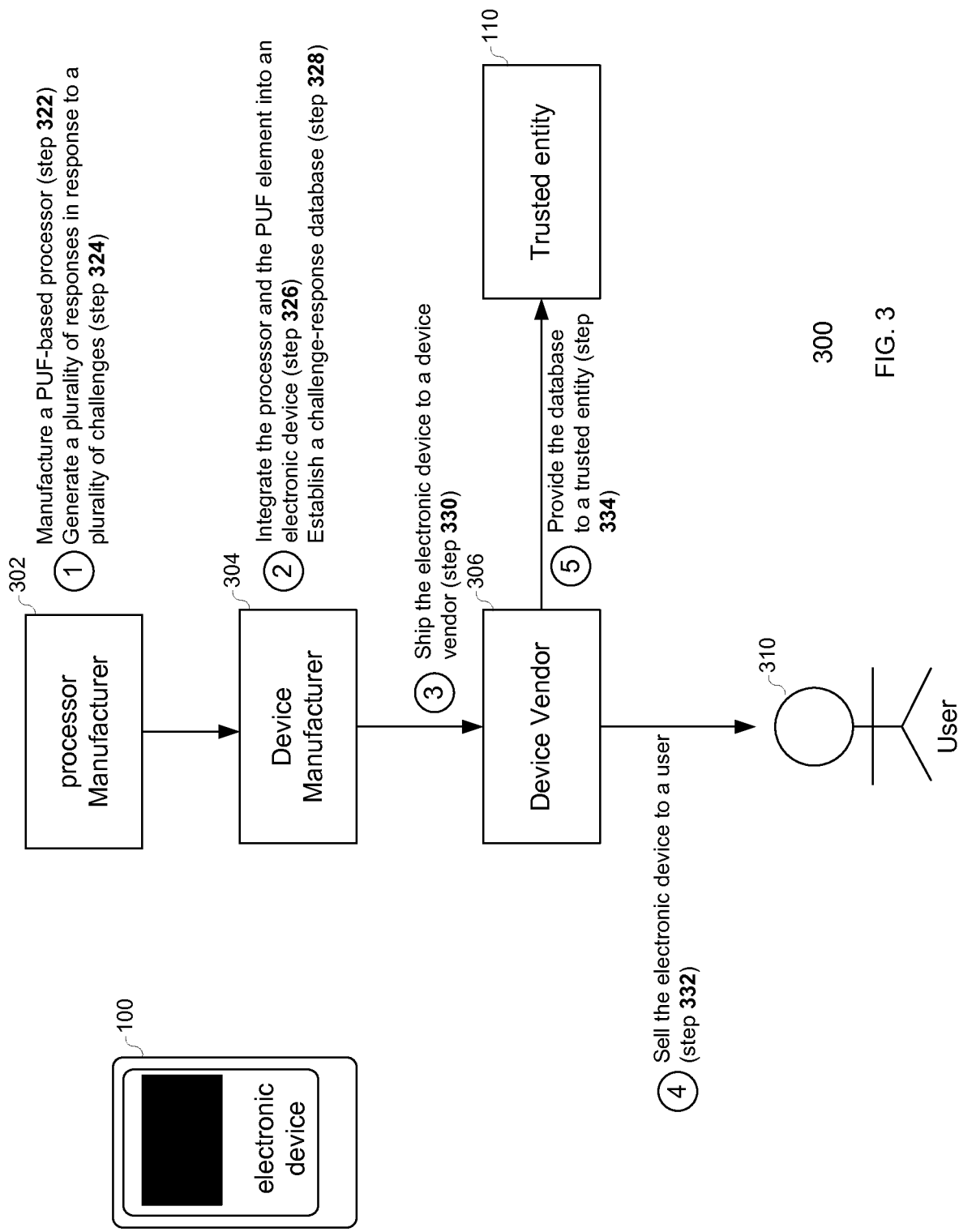
FIG. 3 illustrates an exemplary method of configuring an electronic device for PUF-based device authentication according to various embodiments of the invention.

FIG. 3 illustrates an exemplary method 300 of configuring an electronic device for PUF-based device authentication according to various embodiments of the invention. This method 300 involves a processor manufacturer 302, a device manufacturer 304, a device vendor 306, a trusted entity 110, and a device user 310. At step 322, the processor manufacturer 302 manufactures a processor that is coupled to a PUF element, and the PUF element integrates at least one PUF. In some embodiments, the PUF element is integrated to the processor. The PUF element provides the processor with a unique input based on the unique physical features of the at least one PUF. At step 324, a plurality of responses are generated by the processor in response to a plurality of challenges based on the unique input. The set of challenges-responses pair is recorded. In some embodiments, step 324 happens during production test of the processor.

At step 326, the device manufacturer 304 integrates the processor and the PUF element into an electronic device. In some embodiments, the plurality of responses are generated after the processor and the PUF element are integrated into the electronic device. The plurality of challenges and the plurality of responses are recorded from the processor 102 via the communication interface 106 and further handed over to the trusted entity 110. At step 328, a challenge-response database is established based on the plurality of challenges and responses, and is particularly associated with an identification number of the electronic device. At step 330, the electronic device is shipped to a device vendor 306. At step 332, the device vendor 306 sells the electronic device to a device user 310. At step 334, a trusted entity 110 receives user information and the corresponding challenge-response database associated with the electronic device, and therefore, the trusted entity 110 links any current or future accounts issued to the user with the electronic device.

Once the electronic device is successfully configured according the method 300, it may be reliably authenticated during a trusted transaction based on the unique input associated with its PUF. During a trusted transaction, the device user 310 makes a request for a trusted transaction from the electronic device. The trusted entity may send out a challenge selected from the challenge-response database associated with the specific electronic device, and thereby, authenticate the electronic device according to a response returned from the electronic device. Such a challenge-response authentication process might repeat several times to increase the level of security. This device authentication process is not only applicable in a financial transaction, but also in an identity verification process.

Figure 4:
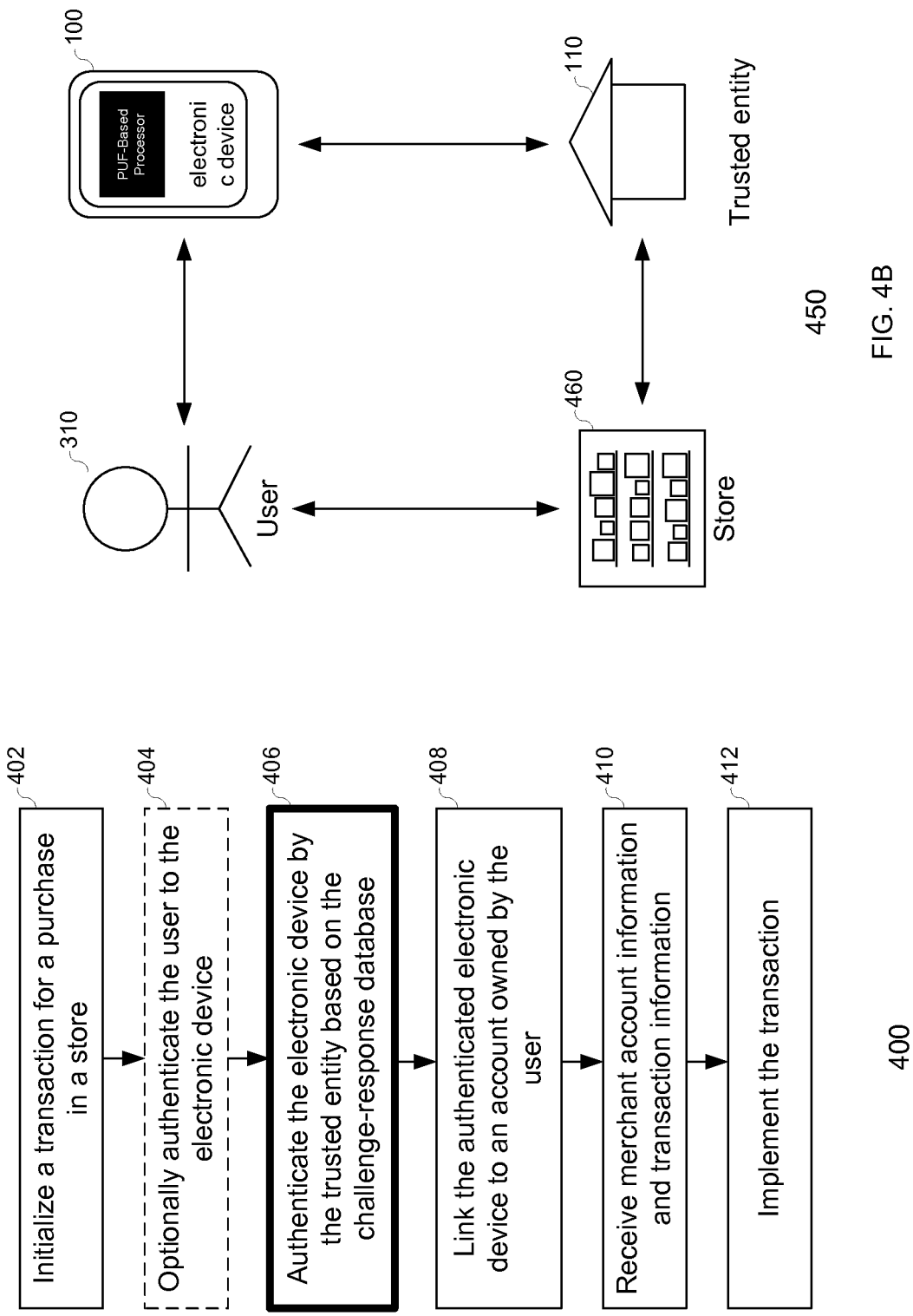
FIG. 4A illustrates an exemplary method of making a secure payment using an electronic device according to various embodiments of the invention.
FIG. 4B illustrates a corresponding relationship among involved parties according to various embodiments of the invention.

FIG. 4A illustrates an exemplary method 400 of making a secure payment using an electronic device according to various embodiments of the invention, and FIG. 4B illustrates a corresponding relationship 450 among involved parties according to various embodiments of the invention. In this financial transaction, the involved parties 450 include a device user 310, an electronic device 100, a trusted entity 110 and a store 460. The trusted entity 110 may be a credit card company that issues a credit card to the device user 310 or a bank that issues a debit card to the device user 310. The device user 310 attempts to use the credit card or the debit card to make a payment for a purchase placed with the store 460.

At step 402, the financial transaction is initialized for a purchase made in the store 460. The purchase may occur virtually in an online store or physically in a local store. At optional step 404, the device user 310 might be authenticated by the electronic device 100. For this step, various authentication means may be used, and such means include, but are not limited to, PIN codes and biometric means, such as eye pattern or fingerprint recognition. In various embodiments, the device user might even need to enter another PIN to access an account on the online store. However, such an access does not mean that the user 310 is automatically associated with the credit or debit card in a safe manner.

In accordance with the invention, the electronic device 100 has to be authenticated with the trusted entity 110 before the financial transaction may be approved and processed by the trusted entity 110. At step 406, the electronic device 100 is authenticated by the trusted entity 110 based on the challenge-response database that is established during device manufacturing including testing steps. In certain embodiments, the device user 310 may request financial transactions from more than one electronic device. More than one challenge-response databases are provided to the trusted entity 110, and each database is identified in the trusted entity by the identification number 202 of the electronic device as shown in FIG. 2.

At step 408, the authenticated electronic device 100 is linked to an account owned by the device user 310. At step 410, the trusted entity 110 receives merchant account information and transaction information, and at step 412, the transaction is implemented by the trusted entity 110.

Figure 5:
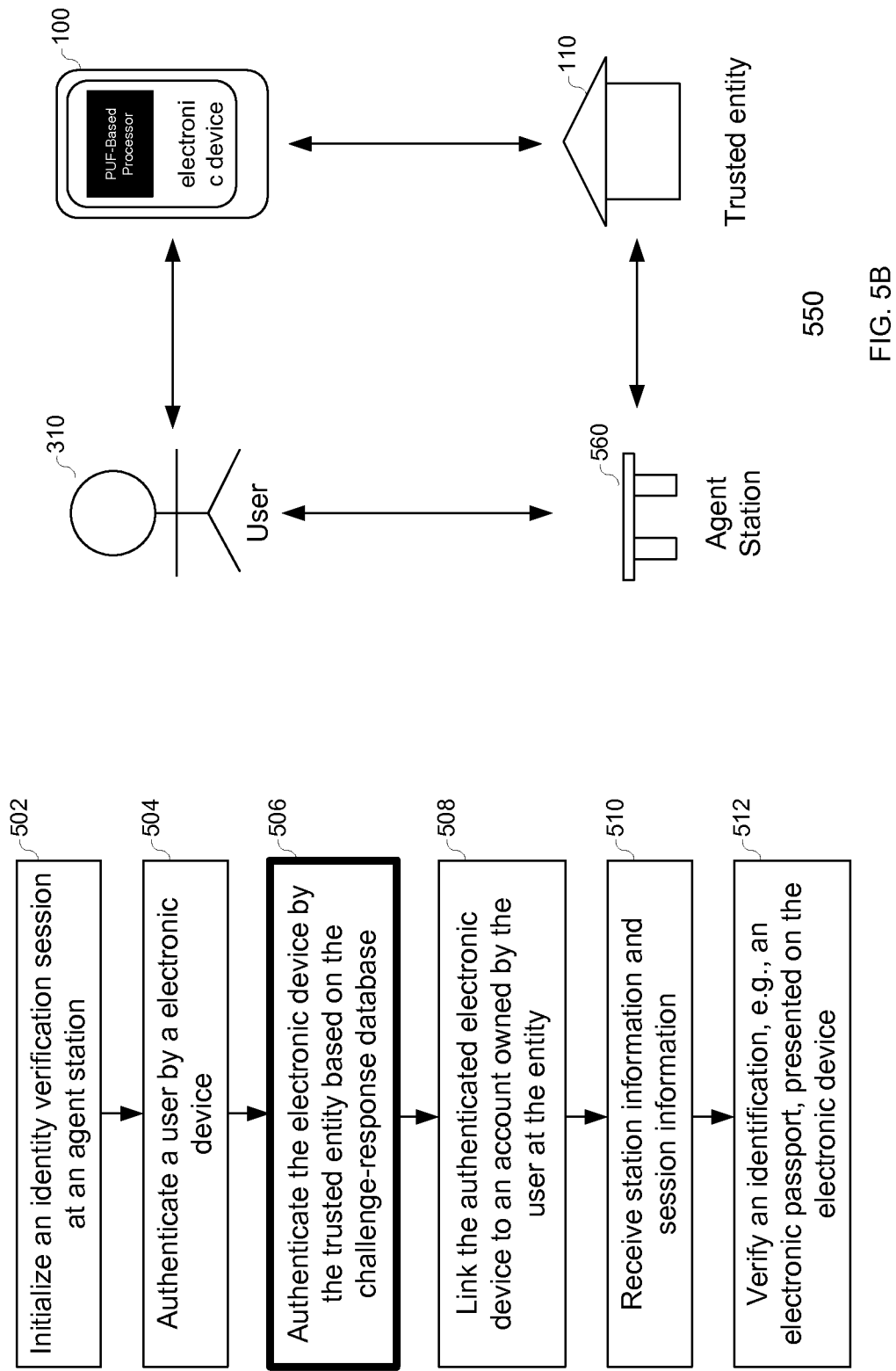
FIG. 5A illustrate an exemplary method of electronically verifying a secure identity according to various embodiments of the invention.
FIG. 5B illustrates a corresponding relationship among involved parties according to various embodiments of the invention.

FIG. 5A illustrate an exemplary method 500 of electronically verifying a secure identity according to various embodiments of the invention, and FIG. 5B illustrates a corresponding relationship 550 among involved parties according to various embodiments of the invention. In this embodiment, the trusted transaction involves an identity verification process. The secure identity may be linked to a driver's license, a passport, a social security account or other confidential accounts, and therefore, the trusted transaction has to be maintained at a high level of security. The involved parties 550 include a device user 310, an electronic device 100, a trusted entity 110 and an agent station 560.

The trusted entity 110 may be a government branch that manages certain business associated with the secure identity, and the agent station 560 is associated with a local representative that interacts with the device user 310. One exemplary trusted entity 110 is the Customs and Boarder Protection (CBP), and a passport of an individual has to be verified at an agent station 560 before the CBP authorizes an entry into the country. The device user 310 may use an electronic device as his electronic passport, and such a passport may be conveniently verified at the agent station 560 according to the method 500.

At step 502, an identity verification session is initialized at an agent station 560. At step 504, the device user 310 is authenticated by the electronic device 100. In some embodiments, the device user 310 enters a PIN to access the electronic device 100. At step 506, the electronic device 100 is authenticated by the trusted entity 110 based on the challenge-response database that is established during device manufacturing. At step 508, the authenticated electronic device 100 is linked to an account owned by the device user 310. At step 510, the trusted entity 110 receives station information and session information, and at step 512, the identity of the device user 310 is verified. In one embodiment, an electronic passport stored in the electronic device 100 is verified with corresponding data stored in a database managed by the trusted entity 110, i.e., the government.

In some embodiments, when a higher security level is required, the trusted entity 110 may only allow each device user 310 to be associated with one particular electronic device.

Figure 6:
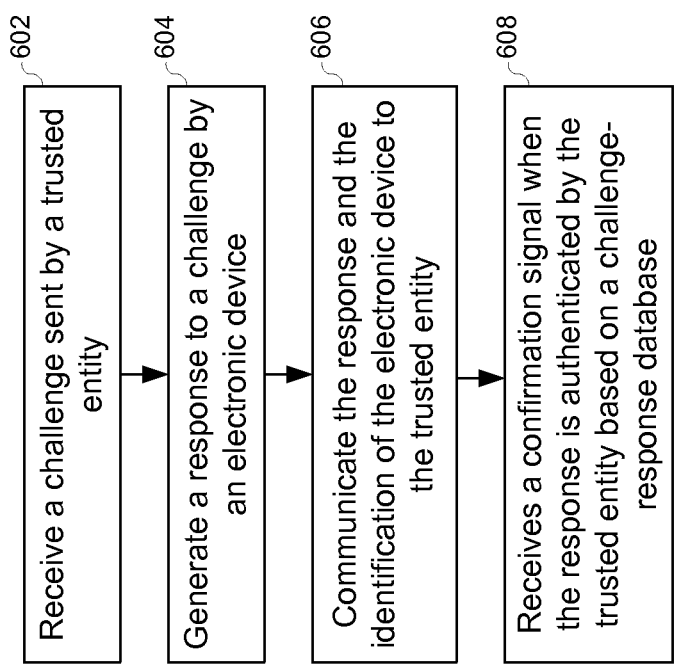
FIG. 6 illustrates an exemplary method of authenticating an electronic device based on a challenge-response database according to various embodiments of the invention.

FIG. 6 illustrates an exemplary method 600 of authenticating an electronic device based on a challenge-response database according to various embodiments of the invention. This method of device authentication 600 may be applied as step 406 in a financial transaction 400 or as step 506 in an identity verification process 500. At step 602, the electronic device receives a challenge sent by a trusted entity. At step 604, a response is generated in response to the challenge by a processor based on a unique input provided by a PUF element, and the processor and the PUF element are integrated within the electronic device. At step 606, the response is communicated to the trusted entity.

In some embodiments, the challenge is associated with a plurality of responses. In one embodiment, a selection signal is received together with the challenge by the electronic device, and the processor in the electronic device selects one particular response method to process the challenge. In another embodiment, the selection signal is determined by the processor, and the response is returned together with the selection signal. Therefore, the trusted entity may properly link one of the plurality of responses with the challenge.

At step 608, the electronic device receives a confirmation signal, when the response is authenticated by the trusted entity based on a challenge-response database. The challenge-response was previously set forth by the processor in the electronic device based on the unique input provided by the PUF element.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

I claim:

1. An electronic device comprising:
 at least one physically unclonable function (PUF) element providing an input based on at least one PUF, the input associates to a specificity of the at least one PUF;
 a processor receiving the input from the at least one PUF element, processing a challenge based on the input, and generating a response according to a response method selected among a plurality of response methods associated with the challenge; and
 a communication interface receiving the challenge and returning the response together with a selection signal indicating the response method selected for authentication of the electronic device.

2. The electronic device of claim 1, wherein the electronic device has a corresponding identification number for identification.

3. The electronic device of claim 1, wherein the processor is integrated with the at least one PUF element.

4. The electronic device of claim 1, wherein the at least one PUF is associated with one of a resistor array, a capacitor array, a memory, and a delay loop.

* * * * *